Figure 1:
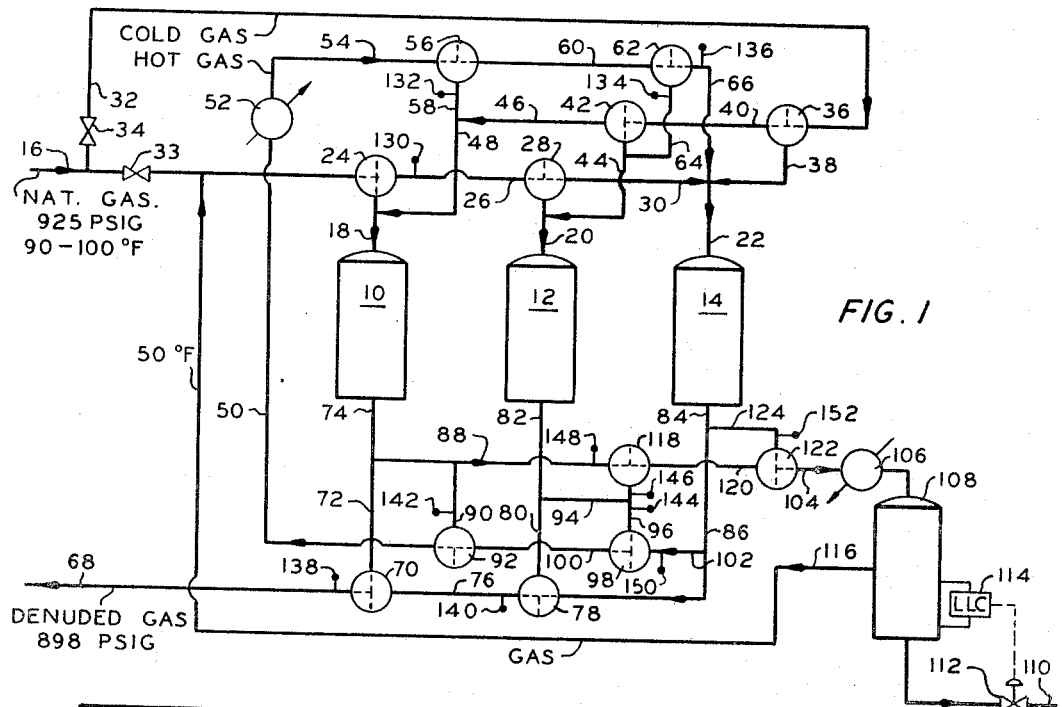

INVENTORS
R.C. BRACKEN
DE WAYNE MADDOX
BY
*Young & Quigg*
ATTORNEYS

Feb. 21, 1967  R. C. BRACKEN ET AL  3,304,764
METHOD AND APPARATUS FOR DETECTING
LEAKS IN THREE-WAY VALVES
Filed March 16, 1964  2 Sheets-Sheet 2

INVENTORS
R.C. BRACKEN
DE WAYNE MADDOX
BY
*Young & Quigg*

ATTORNEYS

United States Patent Office 3,304,764
Patented Feb. 21, 1967

3,304,764
METHOD AND APPARATUS FOR DETECTING LEAKS IN THREE-WAY VALVES
Robert C. Bracken and De Wayne Maddox, Bartlesville, Okla., assignors to Phillips Petroleum Company, a corporation of Delaware
Filed Mar. 16, 1964, Ser. No. 352,137
7 Claims. (Cl. 73—46)

This invention relates to a method and arrangement of apparatus for detecting leaky 3-way valves.

In various plant operations such as in a plant for extracting natural gasoline from natural gas, 3-way valves are utilized for switching flow of fluid stream from one feed line to another feed line entering the valve with a common effluent or delivery line or from one delivery line to another so that flow through the valve is from a common feed line to one or the other of a pair of effluent or delivery lines. In such a plant system, leakage of 3-way valves may go on undetected for a substantial period with attendant waste and inefficiency in the plant process.

This invention is concerned with a method and arrangement of apparatus for detecting leakage through 3-way valves in such a plant.

An object of the invention is to provide a method and arrangement of apparatus for detecting a leak in a 3-way valve connecting three lines carrying fluids at substantially different pressures and substantially different temperatures. Another object is to provide a method and arrangement of apparatus for detecting leaks through 3-way valves in a gasoline adsorption process in which raw natural gas is fed through an adsorber containing a solid adsorbent in a first phase of a cycle, the adsorbent is then desorbed by passing a hot gas therethru in a second phase of the cycle, and the adsorbent is then cooled by passing a cooled gas therethru in a third phase of the cycle to prepare the adsorbent for another adsorption phase of the cycle. Other objects of the invention will become apparent to one skilled in the art upon consideration of the accompanying disclosure.

A broad aspect of the invention comprises sensing the fluid temperature in an effluent line of relatively low pressure from a 3-way valve under conditions such that leakage from a relatively high pressure line leading into the valve and carrying a fluid of substantially different temperature than normally in the effluent line leaks into said effluent line thru said valve. The valve can either be closed to the high pressure line whereby leakage is thru the closed valve in the low pressure effluent line or the flow can be from a relatively high pressure line to an effluent line for high pressure fluid with the valve closed to flow to an effluent low pressure line so that leakage occurs into the relatively low pressure effluent line. In other words, there are two positions of the temperature sensing device, such as a thermocouple, with respect to the lines connected with the 3-way valve. In one position the thermocouple is connected with a line communicating with a relatively low pressure gas connected with the valve and during one phase of operation of the valve, flow is cut-off to the line in which the thermocouple is positioned and the feed through the valve is from a relatively high pressure line to a second effluent line. In the other position, the thermocouple is placed on an effluent line connected through the valve with a relatively low pressure line and a relatively high pressure line connects with the valve but is closed to flow so that leakage through the valve is from the relatively high pressure line to the effluent line for low pressure fluid whereby a substantially different temperature between the fluids in the low pressure and high pressure lines provides an abnormal temperature at the sensing point.

An important application of the invention is in the adsorption of natural gasoline from a stream of nature gas containing same. In such a process it is conventional to operate with three adsorbers in parallel and in a cycle of three separate phases comprising adsorbing in one adsorber, cooling the second adsorber preparatory to the adsorption phase and succeeding the desorption phase, and desorbing the third adsorber following an adsorption phase and preceding a cooling phase. In this operation of a gasoline adsorption plant, different gases are successively fed to each adsorber from 3 separate feed lines connected by branch lines to the adsorbers with 3-way valves being positioned at the intersections of these lines so as to control the flow of the desired gas to the adsorbers for each separate phase of the cycle, including adsorption, desorption, and cooling. Likewise, three different delivery lines are connected by branch lines with the effluent lines from each of the adsorbers and 3-way valves are positioned at the intersections of these lines for controlling the flow of the separate gases to the desired distribution or circulation lines.

Figure 2:
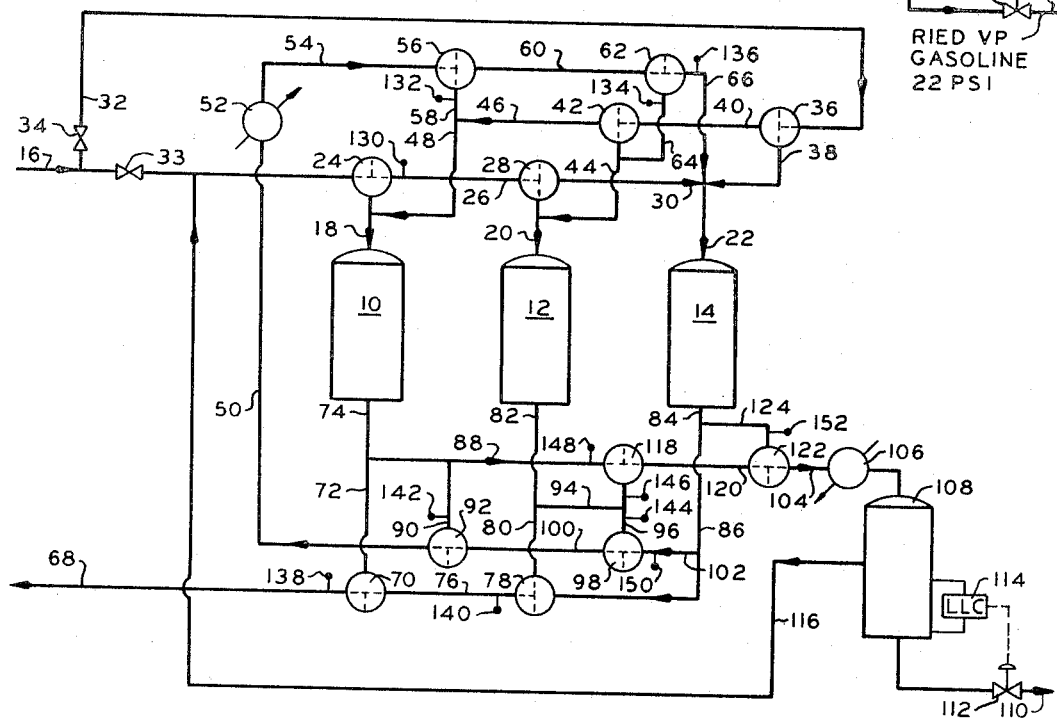
Figure 3:
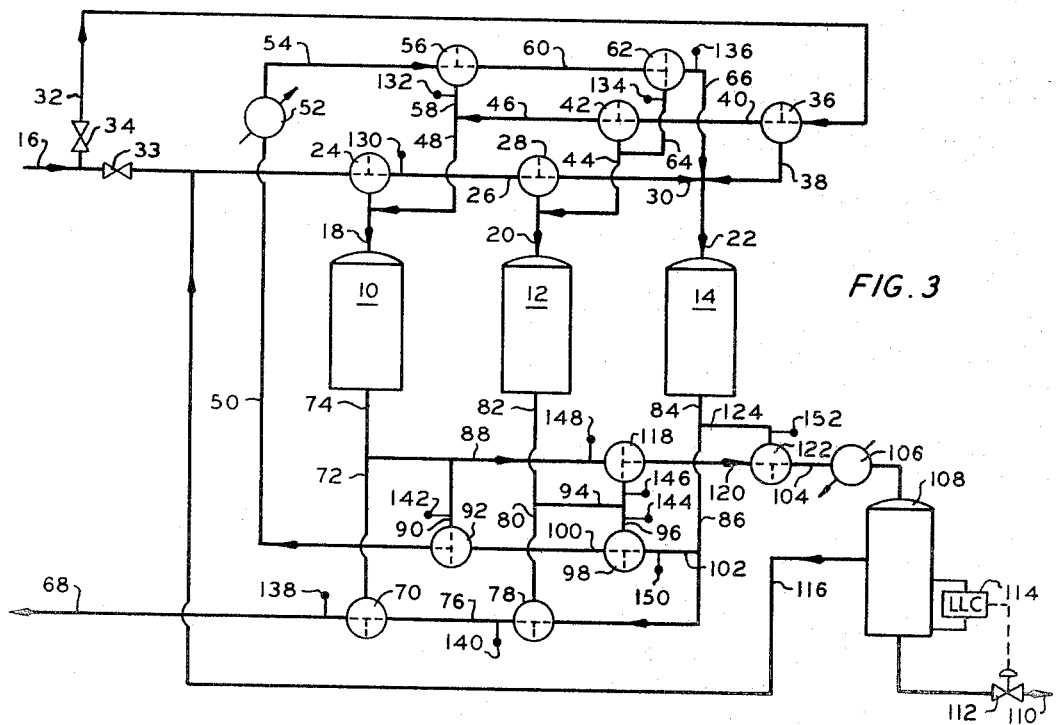
Figure 4:
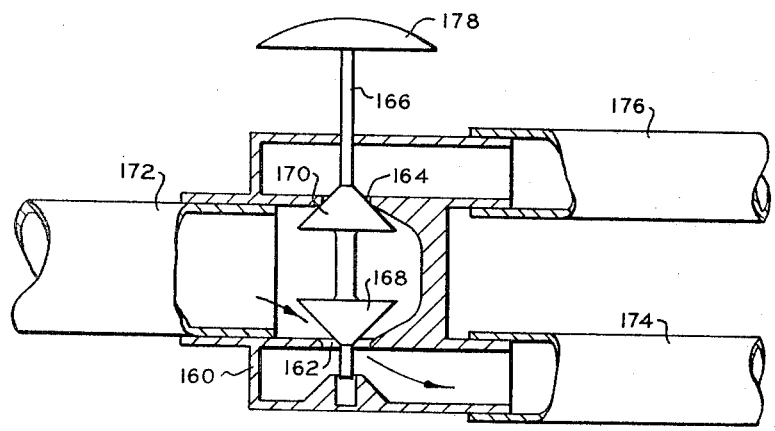

A more complete understanding of the invention may be obtained by reference to the accompanying schematic drawing of which FIGURE 1 is a flow of a gasoline adsorption process showing an arrangement of apparatus in accordance with the invention during one phase of a cycle; FIGURE 2 is a similar flow of the second phase of a cycle; FIGURE 3 is a similar flow showing a third phase of the cycle; and FIGURE 4 is a view in partial section of a 3-way valve which may be utilized in the invention.

Referring to FIGURE 1 adsorbers 10, 12, and 14 are connected to feed lines, branch lines, and effluent lines to operate in parallel. These adsorbers contain a solid adsorbent (not shown) such as silica gel, activated alumina, molecular sieve material or similar adsorbent. A feed line 16 for natural gas is connected by conduit and valve means with each of adsorbers 10, 12, and 14 provided with inlet conduits 18, 20, and 22, respectively. A 3-way valve 24 connects feed line 16 with conduit 18 and also with conduit 26 leading to 3-way valve 28 which in turn connects conduits 20 and 26. Conduit 30 also connects with conduit 22. Thus, feed line 16 together with valves 24 and 28 and conduits 18, 26, 20, 30, and 22 provide means for passing natural gas feed alternately to each of the adsorbers.

Since the natural gas in line 16 is sufficiently cool to be used as cooling gas for cooling an adsorber after adsorption with hot gas, line 32 connects with line 16 upstream of valve 33 and is provided with valve 34. Line 32 connects with 3-way valve 36 which connects this line with either conduit 38 or conduit 40. Since conduit 38 connects with inlet conduit 22, a flow path for cooling gas to adsorber 14 is provided. Conduit 40 connects with 3-way valve 42 which connects with conduits 44 and 46. Since conduit 44 connects with inlet conduit 20, a flow path for cooling gas to adsorber 12 is provided. Conduit 46 connects with conduit 48 which in turn connects with inlet conduit 18 so as to provide a flow path for cooling gas into adsorber 10.

The natural gas used in cooling the adsorbers is also utilized in the desorption phase of the cycle by heating the effluent cooling gas from the adsorbers passing thru line 50 into heater 52. This heater heats the natural gas admitted from line 50 to about 500–525° F. and the heated gas is passed thru conduit 54 to 3-way valve 56 which connects with conduit 58 leading to conduit 48 to provide a flow path for a hot gas into adsorber 10 thru inlet conduit 18. Conduit 60 connects valve 56 with 3-way valve 62 which also connects with conduits 64 and 66. Conduit 64 connects with conduit 44 leading into inlet conduit 20 to provide for flow of hot gas into adsorber 12. Conduit 66 leads directly into inlet conduit 22 connecting with adsorber 14 to provide a flow path thereto for hot desorption gas.

Denuded gas from the three adsorbers is collected in line 68 and passed to a distribution line or other disposal. Line 68 is connected with adsorber 10 thru 3-way valve 70 and conduit 72 which leads into effluent conduit 74 connecting directly with adsorber 10. Line 68 connects adsorber 12 thru 3-way valve 70, conduit 76, 3-way valve 78, conduit 80, and effluent conduit 82 connecting directly with the adsorber. The flow path from adsorber 14 to line 68 is thru effluent conduit 84 and conduit 86 leading into valve 78 which connects with conduit 76 and valve 70.

Each of the adsorbers is connected with line 50 which passes the effluent cooling gas into heater 52 to provide the hot desorption gas for the process. Effluent line 74 from adsorber 10 connects with conduit 88 which in turn connects with conduit 90 and 3-way valve 92 to provide a flow path into line 50. The flow path for effluent cooling gas from adsorber 12 is thru effluent conduit 82, conduit 94, conduit 96, 3-way valve 98, conduit 100, and valve 92 which connects directly with line 50. The flow path from adsorber 14 to line 50 is thru conduits 84, 86, 102, 3-way valve 98, conduit 100, and valve 92.

Effluent lines 74, 82, and 84 leading from the three adsorbers are each connected with line 104 for passing hot desorption gas thru cooler 106 into separator 108. Cooler 106 cools the stream in line 104 to about 50° F. The cooled fluid comprising liquid natural gasoline and lighter gaseous hydrocarbons is separated into a liquid phase and a gaseous phase. The liquid natural gasoline is withdrawn thru line 110 under the control of valve 112 which is operated by liquid level controller 114 to maintain a suitable liquid level in the separator below effluent line 116. The effluent line 116 conducts the cold gaseous phase into feed line 16 for passage thru the adsorbers with the natural gas feed to recover any residual gasoline therein. Addition of cold recycle gas reduces the gas in line 16 downstream of valve 33 to about 70° F.

The flow from effluent conduit 74 to separator 108 is thru conduit 88, 3-way valve 118, conduit 120, and 3-way valve 122 which connects with conduit 104 leading thru cooler 106 into separator 108. The flow to line 104 from effluent conduit 82 is thru conduit 94, valve 118, conduit 120, and 3-way valve 122. The flow of rich desorption gas from effluent conduit 84 is thru line 124, valve 122, line 104, and cooler 106 into separator 108.

In order to detect leaks in the 3-way valves in the system, thermocouples are positioned in the conduits leading from the 3-way valves during at least one phase of the 3 phase-cycle of operation. The preferred position of these thermocouples or other temperature sensing devices will now be detailed. Thermocouple 130 is positioned in conduit 26, thermocouple 132 is positioned in line 58, and thermocouples 134 and 136 are positioned in lines 64 and 66, respectively. The thermocouples in the effluent lines and conduits include thermocouple 138 in line 68, 140 in line 76, 142 in line 90, 144 in line 96, 146 in line 94, 148 in line 88, 150 in line 102, and 152 in line 124. Each of these thermocouples is downstream of a valve during one of the three phases of the cycle so that leakage thru the valve during said phase passes a fluid of different temperature thru the conduit containing the thermocouple and the thermocouple senses a temperature which is above or below normal temperature in the conduit at the particular portion of the phase in which the temperature is sensed. By sensing the temperature periodically in one or more portions of each phase of the cycle in which leakage can cause temperature variation, and establishing a normal temperature pattern for the cycle, and periodically sensing the temperature thereafter at corresponding portions of the phase, any abnormal temperatures sensed are attributable to leaky valves.

FIGURE 1 shows the positions of the valves in the cycling system during the phase of the cycle in which adsorber 10 is on-stream adsorbing natural gasoline components from the natural gas fed therethru from line 16 as heretofore explained. While adsorber 10 is in phase one, adsorber 12 is on phase two, being cooled with cold natural gas from line 16 passing thru line 32, valve 36, conduit 40, valve 42, conduit 44, and inlet conduit 20. Simultaneously with the adsorption in adsorber 10 and the cooling in adsorber 12, adsorber 14 is in phase three, being desorbed with hot gas from heater 52 passing thru conduit 54, valve 56, conduit 60, valve 62, conduit 66, and inlet conduit 22. The 3-way valves in the feed-in cycling system are positioned in FIGURE 1 for the phases described.

Also, the 3-way cycling valves for passing effluent gas from the adsorbers to the distribution lines are positioned in FIGURE 1 for the phases of operation just designated. Denuded gas from adsorber 10 passes thru lines 74, 72, and valve 70 into line 68. Effluent cooling gas from adsorber 12 is passed thru conduits 82, 94, 96, valve 98, conduit 100, and valve 92 into line 50 for passage to heater 52. The rich desorption gas from adsorber 14 passes thru conduits 84 and 124, valve 122, and line 104 thru cooler 106 into separator 108 for phase separation.

FIGURE 2 illustrates the positions of the 3-way valves in the second phase of operation for adsorber 10 which is being desorbed with hot gas from heater 52 passing thru conduit 54, valve 56, and conduits 58, 48, and 18 into the adsorber. The effluent rich gas passes thru conduits 74 and 88, valve 118, conduit 120, valve 122, and line 104 into separator 108. Adsorber 12 is in phase one on-stream adsorbing natural gasoline components during the second phase of the cycle for adsorber 10. The natural gasoline feed from line 16 passes thru valve 24, conduit 26, valve 28, and conduit 20 into the adsorber. The effluent denuded natural gas from adsorber 12 passes thru conduits 82 and 80, valve 78, conduit 76, and valve 70 into line 68.

While adsorber 12 is on phase one and adsorber 10 is on phase two, adsorber 14 is on phase three being cooled in preparation for the subsequent adsorption phase by passing relatively cold natural gas from line 16 thru line 32, valve 36, and conduits 38 and 22 thru the adsorber. The effluent gas during this phase passes thru conduits 84, 86, 102, valve 98, conduit 100, and valve 92 into line 50 for use as heating gas after passing thru heater 52.

FIGURE 3 shows the 3-way valve positions on the next phase of the cycle for each adsorber. Adsorber 10 is being cooled (phase three), adsorber 12 is being desorbed (phase two) and adsorber 14 is on-stream adsorbing natural gasoline components from the natural gas feed (phase one). During this phase, cold natural gas passes thru line 32, valve 36, conduit 40, valve 42, and conduits 46, 48, and 18 into adsorber 10. The effluent cooling gas passes thru conduits 74, 88, and 90, and thru valve 92 into line 50 for passage thru heater 52 to provide hot desorbing gas.

Simultaneously with the cooling of adsorber 10, adsorber 12 is fed hot desorption gas from heater 52 which passes thru conduit 54, valve 56, conduit 60, valve 62, and conduits 64, 44, and 20 into desorber 12. Effluent rich gas passes from adsorber 12 into conduits 82, 94, valve 118, conduit 120, valve 122, and line 104 thru cooler 106 into phase separator 108 for recovery of the liquid gasoline therefrom.

In this phase of the cycle, adsorber 14 is on-stream recovering natural gasoline from the natural gas passing from line 16 thru valve 24, conduit 26, valve 28, and conduits 30 and 22 into the adsorber. The denuded gas passes thru conduits 84, 86, valve 78, conduit 76, and valve 70 into line 68.

In FIGURE 4, a valve body 160 is provided with ports 162 and 164 thru which valve stem 166 extends. Valve heads 168 and 170 are positioned on stem 166 intermediate seats 162 and 164, head 168 seating in port 162 in one valve position and opening this port in the other position; head 170 seats in port 164 when port 162 is open and opens this port when head 168 is seated. Conduit 172 is a feed conduit and conduits 174 and 176 are delivery or effluent conduits. In some plant applications conduits 174 and 176 are feed conduits while conduit 172 is a delivery conduit. Valve stem 166 connects with operating means 178 which may be any conventional type.

Valves used in the plant application of the invention operate as indicated with instrument air. These valves are operated in response to the temperature of the effluent cooling gas at a selected minimum value. However, they may be operated on a time cycle such as switching from one phase of operation to the next every 20 or 30 minutes. The operation of 3-way valves in such a plant as that discussed herein is presented in application S.N. 194,572, filed May 14, 1962. Adsorber operation is disclosed in application S.N. 172,713, filed February 12, 1962.

Suitable 3-way valves as illustrated in FIGURE 4 are available from Fisher Governor Co., Marshalltown, Iowa, Bul. E–600, p. 38, type 657.

The gasoline plant in which the apparatus described is in use feeds 15 million standard cubic feet per day at 925 p.s.i.g. and 90–100° F. thru line 16 into the adsorber system. The plant produces about 188 barrels per day of 22 p.s.i. Reid vapor pressure gasoline. To illustrate the significance of the early detection of a leaky valve in the system, a leak in valve 122 caused a loss of 30 barrels per day of gasoline production until the leaky valve was repaired. When there is a regeneration gas leak, the temperature in the adsorber increases and too much gasoline is left in the natural gas which reduces the gasoline production and also feeds denuded natural gas which is not of specification grade into the distribution pipe line 68. A 20° F. increase in adsorber temperature is equivalent to losing ⅓ of the gasoline production obtained in normal operation.

Pressures are controlled in the operation of the adsorber system so that the cooled gas in line 32 is at the highest pressure, the hot regeneration gas is at the next highest pressure, and the natural gas feed passing to the adsorbers downstream of valve 38 is at the lowest pressure in the system. The pressure control is effected by opening valve 34 to approximately full flow and pinching down on valve 33. The pressure drop across lines 16 and 68 is normally controlled at about 26 p.s.i.g. In other words, while the pressure in line 16 is at about 925 p.s.i.g., the pressure in line 68 is about 899 p.s.i.g. If the pressure drop across these lines varies over about 3 p.s.i.g., a leak in one or more valves is indicated.

In order to illustrate the operation of the valve-leakage detection system, reference is made to the table below which presents the temperatures sensed at the various thermocouples while each adsorber is in the three phases of the cycle of operation at the beginning, at the middle, and at the end of each phase of the cycle. The nine temperatures sensed for each thermocouple represent a complete cycle of operation.

*Table*

NORMAL TEMPERATURES, ° F.

| Thermocouple | Phase 1 Adsorber 10 | | | Phase 2 Adsorber 12 | | | Phase 3 Adsorber 14 | | |
|---|---|---|---|---|---|---|---|---|---|
| | Begin | Middle | End | Begin | Middle | End | Begin | Middle | End |
| 130 | 86 | 75 | 73 | 86 | 70 | 71 | 86 | 70 | 70 |
| 134 | 483 | 441 | 417 | 418 | 367 | 321 | 535 | 567 | 575 |
| 138 | 130 | 92 | 87 | 130 | 92 | 87 | 129 | 95 | 79 |
| 140 | 90 | 88 | 85 | 130 | 90 | 74 | 129 | 92 | 85 |
| 150 | 203 | 196 | 196 | 526 | 436 | 146 | 141 | 141 | 140 |
| 144 | 496 | 193 | 123 | 152 | 133 | 126 | 126 | 116 | 220 |
| 142 | 250 | 230 | 203 | 176 | 248 | 263 | 496 | 373 | 136 |
| 136 | 561 | 563 | 555 | 555 | 500 | 470 | 378 | 383 | 367 |
| 132 | 338 | 299 | 260 | 561 | 573 | 568 | 526 | 393 | 373 |
| 148 | 393 | 279 | 250 | 83 | 143 | 443 | 402 | 253 | 255 |
| 146 | 447 | 410 | 250 | 200 | 126 | 100 | 86 | 146 | 467 |
| 152 | 81 | 275 | 485 | 496 | 367 | 134 | 134 | 134 | 125 |

ABNORMAL TEMPERATURES, ° F.

| | | | | | | | | | |
|---|---|---|---|---|---|---|---|---|---|
| 130 | 86 | 75 | 73 | 86 | 110 | 110 | 86 | 71 | 69 |
| 152 | 90 | 275 | 485 | 480 | 350 | 130 | 87 | 100 | 230 |
| 140 | 80 | 275 | 485 | 130 | 90 | 74 | 129 | 92 | 85 |
| 138 | 100 | 120 | 140 | 86 | 125 | 145 | 140 | 120 | 100 |

The abnormal temperatures in the preceding table for thermocouples 130, 152, 140, and 138 clearly indicated that valves 24, 122, and 70, respectively, were leaking. Referring to thermocouple 130, it can be seen that the recorded temperatures (while adsorber 10 was operating in phase 1 adsorbing gasoline from the natural gas feed while adsorber 12 was in phase 2 on cooling gas and adsorber 14 was in phase 3 on hot desorption gas) are normal but that the temperatures sensed by this thermocouple when adsorber 10 was in phase 2 were abnormally high at the middle and end of this phase. During this phase as seen in FIGURE 2 hot gas is passing from heater 52 thru line 54, valve 56 and lines 58, 48, and 18 into adsorber 10. At the same time raw natural gas is passing thru value 24, line 26, valve 28, and line 20 into adsorber 12. Since the pressure of the natural gas fed downstream of valve 24 is lower than the pressure of the hot desorption gas, a leak in valve 24 permits hot gas to pass from conduit 48 thru conduit 18 into and thru valve 24 so that the hot gas mixes with the natural gas in line 26, thereby raising the temperature of this gas which is then sensed by thermocouple 130.

A leak is also detectable in valve 122 from a study of the abnormal temperatures when adsorber 14 is in phase 1 compared with the normal temperatures for thermocouple 152. The intermediate temperature of 100° F. is considerably below the normal intermediate temperature of 134° F. for this thermocouple in this phase and the final abnormal temperature of 230° F. is considerably higher than the normal temperature of 125° F. at the end of the phase. It should be noted that at the beginning of this phase, denuded natural gas is passing thru lines 84 and 86 and valves 78 and 70 to distribution line 68 and this gas is at a relatively lower pressure than the hot desorption gas passing into adsorber 12. This hot desorption gas is cooled substantially as it raises the temperature of the adsorbent in adsorber 12 and passes from the adsorber thru lines 82, 94, valve 118, line 120, and valve 122 into line 104 for delivery to separator 108. If there is a leak in valve 122, there will be flow into line 124 because of the lower pressure in line 84. At the beginning of the phase the effluent desorption gas is relatively cold but as the temperature of the adsorbent in 12 is raised by heat exchange with the hot gas, the effluent gas becomes hotter and any leak thru the valve near the end of the phase clearly will raise the temperature of thermocouple 152. Since the temperature of this thermocouple at the end of phase 1 in adsorber 14 is 230° F. compared with a normal temperature of 125° F., it is clear that there is leakage of hot gas thru valve 122 into line 124.

The temperatures sensed by thermocouple 140 adjacent valve 78 when adsorber 10 is in the first phase clearly indicate a leakage of hot gas into line 76 from line 86 which is connected with hot gas line 84. Unless valve 70 is leaking, this hot gas from line 84 cannot pass thru lines 86 and 76 into line 68. Since thermocouple 140 registers higher than normal temperatures during the middle and end portion of the phase, valve 70 is definitely leaking. This condition is also indicated by the abnormal temperatures recorded for thermocouple 138 just downstream of valve 70 which are above normal from the middle to the end of the phase. The gas leaking thru valve 70 from lines 84, 86, and 76 at the beginning of the first phase in adsorber 10 is relatively cold because of the cold condition of adsorber 14 when hot gas is first cycled to this adsorber. As the hot gas continues to flow thereto, it heats up the adsorbent and the temperature of the effluent gas is greatly increased as is indicated by thermocouple 152 during this phase. The abnormal temperatures during the corresponding phases in adsorbers 12 and 14 recorded by thermocouple 138 also indicate that valve 70 is leaking.

Leakage thru other valves in the system can readily be detected by comparing the thermocouple temperatures at the beginning, the middle, and the end of each phase. To illustrate, if valve 78 is leaking, thermocouple 140 will register high temperatures when adsorber 14 is in phase 1 from hot gas leaking from line 82 thru this valve into line 76. If valve 118 is leaking, thermocouple 146 will register higher than normal when absorber 12 is in phase 1 from hot gas from line 88 leaking thru this valve into line 94. If valve 56 is leaking, thermocouple 132 will register high adsorber 10 is in first phase because of the leaking of hot gas from line 54 thru this valve into line 58. Also thermocouples 132 and 134 will register low when absorber 14 is in the first phase from cold gas leaking from line 46 thru line 58 and valve 56 into hot gas in line 60.

Thus it can be seen that leakage of the various 3-way valves in the system can be detected by recording normal gas temperatures at a selected time during each phase when it is known that the valves are operating properly and thereafter sensing the temperature at each thermocouple location at the corresponding phase periods and comparing these temperatures with the normal temperature pattern. Substantial deviations from normal temperatures clearly indicate valve leakage and this leakage can be assigned to definite valves in the system in accordance with the location of the thermocouple registering abnormal temperature and the flow pattern thru the valves at the time such temperatures are sensed.

Certain modifications of the invention will become apparent to those skilled in the art and the illustrative details disclosed are not to be construed as imposing unnecessary limitations on the invention.

We claim:

1. A method of detecting a leak in a 3-way valve connected with three separate lines carrying three different fluids during a cycle of operation and positionable during said cycle of operation to alternately communicate one of said lines with each of the others, at least one of said lines being a feed line and at least one being a delivery line, one position of said valve communicating said feed line with said delivery line and the remaining line having access to a fluid at a substantially different temperature and pressure than the temperature and pressure of the fluid in said delivery line when said valve is in said one position, which comprises sensing the temperature in the one of said delivery line and said remaining line at the lower pressure during said cycle of operation while said valve is functioning properly to establish normal temperature at a specific point of said cycle; thereafter, sensing the temperature in said one of said delivery line and said remaining line during said cycle of operation at said specific point; and comparing the last sensed temperature with the normal temperature at said point whereby a substantial temperature difference between sensed and normal temperature indicates a leak in said valve.

2. The method of claim 1 wherein said remaining line has access to a gas of higher temperature and higher pressure than said delivery line and a leak in said valve produces a substantially higher temperature in said delivery line than normal, and the temperature in said delivery line is sensed.

3. The method of claim 1 wherein said remaining line has access to a lower pressure and lower temperature fluid and a leak in said valve allows flow into said remaining line to increase the temperature therein above normal temperature, the temperature in said remaining line being sensed in determining said leak.

4. In the operation of three adsorbers in parallel, each containing a solid adsorbent, each one being successively on an adsorption phase, a regeneration (desorption) phase, and on a cooling phase, and the phases being rotated from the first to the third adsorber, wherein the adsorbers are fed fluid containing an adsorbable component from a first common feed line, a hot desorbing fluid from a second common feed line, and a cooling fluid from a third common feed line, each feed being passed from its respective feed line thru a 3-way valve connecting said feed line with a branch line to its respective adsorber, and wherein the adsorbers deliver effluent fluids to a first common product line, a second common hot fluid line containing desorbed component, and a third common cooling fluid line, each effluent fluid being passed thru a branch line connected to said common effluent lines thru 3-way valves common to at least two of said effluent lines, and wherein the pressures and temperatures in said lines vary with the phase conditions, the method of detecting a leak in one of said 3-way valves comprising periodically sensing the temperature in a selected portion of a phase of operation in a first line of the lines connected with said valve which is downstream pressure-wise of a fluid at a substantially different temperature in a second line thereof, said valve being closed to normal flow from said second line into said first line so that a leak in said valve produces a temperature substantially different than normal temperature in said first line at said selected portion of the phase.

5. In the operation of three adsorbers in parallel, each containing a solid adsorbent, each one being successively on an adsorption phase, a regeneration (desorption) phase, and on a cooling phase, and the phases being rotated from the first to the third adsorber, wherein the adsorbers are fed fluid containing an adsorbable component from a first common feed line, a hot desorbing fluid from a second common feed line, and a cooling fluid from a third common feed line, each feed being passed from its respective feed line thru a 3-way valve connecting said feed line with a branch line to its respective adsorber, and wherein the adsorbers deliver effluent fluids to a first common product line, a second common hot fluid line containing desorbed component, and a third common cooling fluid line, each effluent fluid being passed thru a branch line connected to said common effluent lines thru 3-way valves common to at least two of said effluent lines, and wherein the pressures and temperatures in said lines vary with the phase conditions, the method of detecting a leak in one of said 3-way valves comprising periodically sensing the temperature in a selected portion of a phase of operation in a first of the lines connected with said 3-way valve which is downstream pressure-wise of a fluid at a substantially different temperature than the temperature of the fluid in a second line connected with said valve, said valve being closed to normal flow into said first line and open to flow from said second line thru said valve to a third line, so that a leak in said valve produces a substantially different temperature than normal temperature in said first line at said selected portion of the phase.

6. Apparatus comprising in combination:
(a) a three-way valve having a first inlet port communicating with a first line carrying a high pressure fluid, a second inlet port communicating with a second line carrying a fluid of lower pressure at a substantially different temperature than said first line, and an outlet port communicating with a delivery line;
(b) a single valve head means for alternately simultaneously closing said first inlet port and opening said second inlet port and vice versa; and
(c) a temperature sensing device in communication with fluid in said delivery line for indicating leakage thru the closed port of said first and second inlet ports.

7. Apparatus comprising in combination:
(a) a three-way valve having an inlet port, a first outlet port, and a second outlet port, said inlet port communicating with a line carrying a fluid, and each said outlet port communicating with a separate delivery line;
(b) a single valve head means for alternately simultaneously closing said first outlet port and opening said second outlet port and vice versa; and
(c) separate temperature sensing means in communication with fluid in each of said delivery lines for sensing leakage thru said outlet ports when closed.

References Cited by the Examiner

UNITED STATES PATENTS

| | | | |
|---|---|---|---|
| 1,043,983 | 11/1912 | Thomas | 73—204 |
| 2,171,992 | 9/1939 | Rantine | 73—343 |
| 2,430,122 | 11/1947 | Grace | 137—551 |
| 2,961,868 | 11/1960 | Hooper | 73—49.4 |
| 3,075,552 | 1/1963 | Hunt et al. | 137—551 |

LOUIS R. PRINCE, *Primary Examiner.*

S. CLEMENT SWISHER, *Assistant Examiner.*